United States Patent [19]

Haas

[11] Patent Number: 5,767,380
[45] Date of Patent: Jun. 16, 1998

[54] MEASURING ARRANGEMENT AND METHOD FOR CHECKING THE GEOMETRIC AND DYNAMIC ACCURACY OF TWO MACHINE ELEMENTS DISPLACEABLE WITH RESPECT TO ONE ANOTHER

[75] Inventor: Franz Haas, Stainz, Austria

[73] Assignee: Insitut Für Fertigungstechnik, Technische Universität Graz, Graz, Austria

[21] Appl. No.: 606,446

[22] Filed: Feb. 23, 1996

[30] Foreign Application Priority Data

Feb. 23, 1995 [EP] European Pat. Off. ............ 95102540

[51] Int. Cl.[6] ............................................. G01B 5/14
[52] U.S. Cl. ................................. 73/1.79; 33/502
[58] Field of Search ................. 73/1 J, 1.79, 1.81, 73/1.75; 33/502

[56] References Cited

U.S. PATENT DOCUMENTS

| | | | |
|---|---|---|---|
| 4,435,905 | 3/1984 | Bryan | 33/DIG. 1 X |
| 5,028,180 | 7/1991 | Sheldon et al. | 409/201 |
| 5,111,590 | 5/1992 | Park | 33/502 |
| 5,269,067 | 12/1993 | Waeldele et al. | 73/1 J X |
| 5,285,579 | 2/1994 | Armando | 33/181 |
| 5,341,574 | 8/1994 | Bieg | 73/1 J X |
| 5,396,712 | 3/1995 | Herzog | 33/503 |
| 5,400,638 | 3/1995 | Kim | 73/1 J |
| 5,434,803 | 7/1995 | Yoshida | 73/1 J X |
| 5,533,271 | 7/1996 | Callaghan, Jr. | 73/1 J |

FOREIGN PATENT DOCUMENTS

| | | |
|---|---|---|
| 0 155 084 | 9/1985 | European Pat. Off. . |
| 0 545 658 | 6/1993 | European Pat. Off. . |
| 0 597 299 | 5/1994 | European Pat. Off. . |
| 2 658 442 | 8/1991 | France . |
| 44 19 909 | 12/1994 | Germany . |
| 2 139 112 | 5/1990 | Japan . |
| 2 203 837 | 10/1988 | United Kingdom . |

OTHER PUBLICATIONS

Göntze, W. et al., "Integration der CNC-Messtechnik in Fertigungslinien," 1148 *Microtechnic*, pp. 16–19 (1993).

Primary Examiner—Thomas P. Noland
Attorney, Agent, or Firm—Brinks Hofer Gilson & Lione

[57] ABSTRACT

A measuring arrangement suitable for checking the geometric and dynamic accuracy of two numerically controlled machine elements which are displaceable with respect to each other. A base body is fastened on a carriage of a machine tool to be tested, on which a linear guide with a linear measuring device is rotatably seated. A measuring element is fastened in a spindle of the machine tool and is connected via a guide with the carriage. The measuring element has three pivot bearings and a further linear guide, as well as further measuring devices for measuring the rotating movements around the pivot bearings and along the further linear guide. Thus the measuring arrangement has six degrees of freedom, wherein four rotary and two translatory joints make possible the registration of individual deviations.

15 Claims, 8 Drawing Sheets

| DYNAMIC TESTING METHODS FOR CNC MACHINES ||||
|---|---|---|---|
| NUMBER OF NC AXES | IDENTIFICATION | CHARACTERISTIC VALUES | MEASURING DIAGRAMS |
| 2 | CIRCULAR TEST ISO/DIS 230-4 | DX, DY, D+45, D-45, UX, UY U.S.W. |  |
| 2 | CORNER TEST | OVERSHOOT ERROR<br><br>ROUNDING ERROR |  |
| 1 | STEP RESPONSE TEST | STEP LENGTH |  |
| 1 | CONFORM-ABILITY TEST | DRAG ERROR |  |
| 1 | REVERSE TEST | STOPPED TIME<br><br>PATH DEVIATION AT REVERSING POINTS |  |

FIG.11

FIG.12

MEASURING ARRANGEMENT AND METHOD FOR CHECKING THE GEOMETRIC AND DYNAMIC ACCURACY OF TWO MACHINE ELEMENTS DISPLACEABLE WITH RESPECT TO ONE ANOTHER

FIELD OF THE INVENTION

The invention relates to a measuring arrangement for checking the geometric and dynamic accuracy of two machine elements movable in relation to each other. The invention further relates to a method for employing the measuring arrangement.

Machine tools inherently have faults which cause errors in geometric accuracy on the workpiece. Dynamic inaccuracies are caused by the controls and feeding control circuits. Such inaccuracies cause the path on which the tool moves in relation to the workpiece to deviate from the programmed path.

It is necessary to measure these geometric and dynamic errors to evaluate the accuracy of the numerically controlled (NC) machine. It is possible to perform a sample processing of a selected workpiece and to measure it subsequently. However, it is extraordinarily difficult using such a technique to analyze the reasons for the errors because the technological effects of the tool and the cutting conditions are added. Thus there have been attempts to develop methods and devices for measuring the deviation of the path from the programmed path at the machine itself. Several devices and methods are known for testing the geometric accuracy of NC machine tools. In this connection the so-called circular form test is gaining increasing importance. The circular form test permits the checking of the dynamic properties of the NC machine during continuous-path control operation as well as statements regarding the machine geometry. A circle presents itself as a path since it can be realized by all continuous-path controlled NC machines in the form of circular interpolation and because the measurement of a circle is relatively simple to perform.

To generate a circular path with a continuous-path controlled NC machine tool it is necessary to move two machine components which are linearly moved and disposed at right angles to each other, for example the two units of a compound table, synchronously in accordance with a sine and cosine law in such a way that the circular path is generated as the resultant movement. The circle generated in this way diverges more or less from the ideal, perfect circle because of the limited dynamics of the two control circuits involved, because of mechanical inadequacies and other interfering effects. The effect of the feed rate, for example, is prominent, which usually makes itself known by an increase in the circular distortions when the feed rate is increased.

The purpose of the circular form test is to measure the deviation from the circular form and to evaluate the result in order to draw conclusions regarding the quality of the NC machine.

U.S. Pat. No. 4,435,905 discloses a device for performing the circular form test. A telescoping bar on whose ends spheres have been fixed which are each seated in a respective support is used. For measuring, the two supports are fastened on the NC machine in such a way that their positions correspond to the positions of tools and workpieces. The telescoping bar is formed of two parts which are connected to each other and are longitudinally displaceable so that the telescoping bar length is variable. The displacement of the two parts with respect to each other is registered by an integrated linear measuring system. If one telescoping bar end is moved on a circular path around the other end, the measured values correspond to deviations from the circular shape.

Analogous problems apply to industrial robots. To be able to make statements regarding the accuracy of a robot it is necessary to measure the path errors of the orientation part of the robot while it moves along a programmable path. The circular form test also offers itself to checking the path accuracy of an industrial robot. However, here the problem is much more complex than with an NC machine tool, because movement is not limited to only two movement components, but rather there are up to six degrees of movements synchronously overlaid. For example, with one of the customary bent arm robots which exclusively has swivel joints, six degrees of movement include: three positioning joints in the robot body and three orienting joints in the robot orientation part.

To be able to determine the geometric and dynamic accuracy of such machines, a new measuring arrangement was developed, which is described in German Patent Publication DE 44 19 909 A1 and on which the present invention is based. According to DE 44 19 909 A1, the measuring arrangement consists of a base body which is mounted inertially secure, and on which an arm is rotatably seated with a radial guide in its end area for a tracing element, which is releasably connected with a machine element to be tested. A linear measuring device disposed radially with respect to the axis of rotation of the arm and cooperating with the tracing element is fastened on the arm for registering the circular path deviation of the tracing element. In addition, a further linear measuring device is provided in the end area of the arm parallel with the axis of rotation for measuring the axial displacement of the tracing element.

The linear measuring device disposed radially with respect to the axis of rotation of the arm is a tracer with a very small measuring range so that it is possible to exclusively measure the deviations from a predetermined circular path movement.

SUMMARY OF THE INVENTION

According to a first aspect of the present invention there is provided a measuring arrangement for checking the geometric and dynamic accuracy of two machine elements moved in relation to each other. The measuring arrangement includes a base body fastened on a first machine element, a component rotatably seated on the base body and having a guide for a measuring element that is releasably connected with a second machine element. In addition, an angle measuring device for measuring the rotation of the component with respect to the base body around a first axis of rotation and a linear measuring device provided radially with respect to the axis of rotation of the component, for detecting the movements of the measuring element along the guide wherein the linear measuring device has a measurement representation and a scanning unit which can be moved relatively thereto, and the measuring range of the linear measuring device corresponds approximately to the possible displacement path of the machine elements moved with relation to each other are provided. Also, a measuring carriage on which the scanning unit is disposed, wherein the measuring carriage is simultaneously the support of at least one further linear measuring device for measuring the axial displacement between the measuring carriage and a support which can be releasably connected with the first machine element According to a second aspect of the present invention there is provided a method for checking the geometric and dynamic accuracy of an NC-controlled working head of automatic production or manipulating devices with a measuring arrangement as described above wherein the connection of the support to the measuring carriage is performed in a numerically controlled manner.

It is an object of the present invention to provide a measuring arrangement in which it is possible to register the geometric and dynamic accuracy of machines and which is usable in many ways.

It is a further object of the present invention to provide a method for checking the geometric and dynamic accuracy by employing the measuring arrangement.

The particular advantages of the present invention rest in that the measuring arrangement is universally suitable for measuring circular movements, but also of linear movements within the entire movement path range of the machine elements which are moved relative to each other. A simultaneous measurement of all linear and rotatory movements in space takes place with all movements, so that the measuring arrangement is also suitable for checking the movements of robots to register all axial movements. In spite of the universal employment capability of the measuring arrangement it is relatively simply and sturdily constructed because it consists of standard measuring systems.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
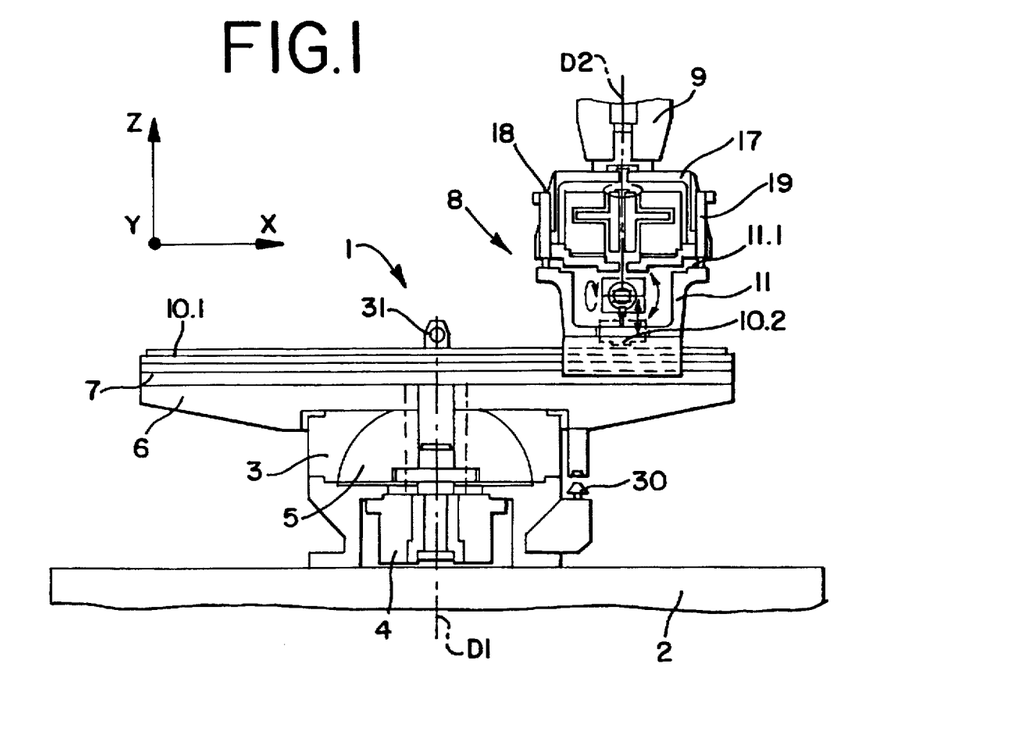
FIG. 1 is a schematic of a portion of a measuring arrangement in accordance with a preferred embodiment of the present invention.

FIG. 1 is a schematic of a portion of a measuring arrangement in accordance with a preferred embodiment of the present invention. The measuring arrangement 1 is mounted on a carriage 2 of a machine tool. The measuring arrangement 1 includes a base body 3 used for fastening the measuring arrangement on the carriage 2. Base body 3 is also a support for an angle measuring device 4. The base body 3 has a precise and play-free air bearing 5 for the rotatable seating of a component 6 around a predetermined axis of rotation D1. The rotation of the component 6 with respect to the base body 3 is measured by the angle measuring device 4. Preferably the angle measuring device 4 is an incremental angular encoder.

Figure 2:
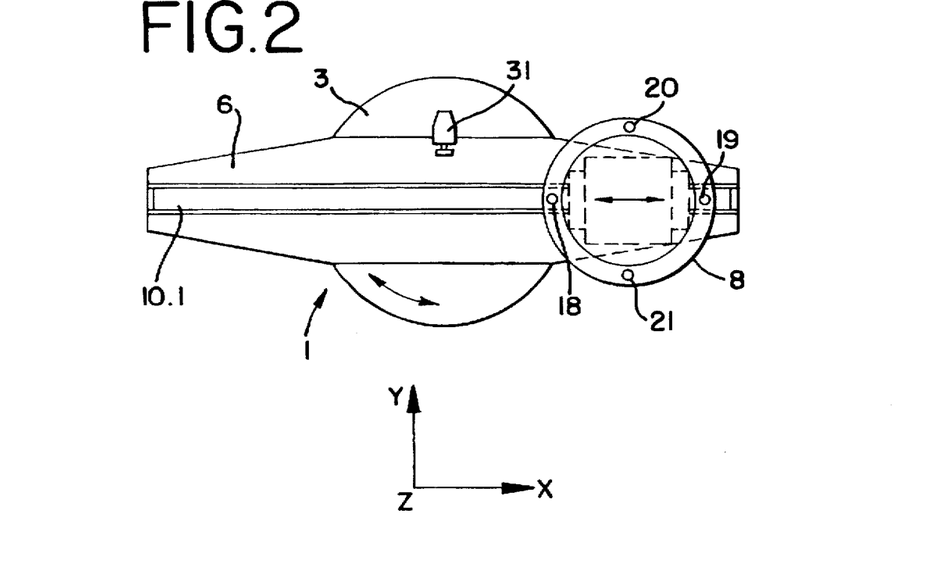
FIG. 2 is a top view of the measuring arrangement shown in FIG. 1.

A linear guide 7 for guiding a measuring element 8, which is releasably connected to a spindle 9 of the machine tool, is located on the rotatably seated component 6. As can be seen from the top view in FIG. 2, the linear guide 7 assures an exact radial linear movement of the measuring element 8 with respect to the component 6. To assure this, the linear guide 7 extends over the entire movement path between the component 6 and the measuring element 8 and, in a particularly advantageous manner, also over the entire possible movement path between the carriage 2 and the spindle 9.

To measure the linear movements extending perpendicularly with respect to the axis of rotation D1 between the base body 3 and the measuring element 8, a linear measuring device 10 is provided parallel with the linear guide 7. This linear measuring device 10 consists of a measurement representation 10.1 which is disposed along the linear guide 7 in the form of an incremental scale and has a length which at least approximately corresponds to the possible movement path of the machine elements 2, 9 which are moved relative to each other. In the illustrated example the scale 10.1 is fastened directly to a surface of the linear guide 7. The incremental graduation of the scale 10.1 is scanned by a scanning unit 10.2, which generates position-dependent electrical signals in a known manner. The scanning unit 10.2 is fixed in place on a measuring carriage 11 of the measuring element 8.

Figure 4:
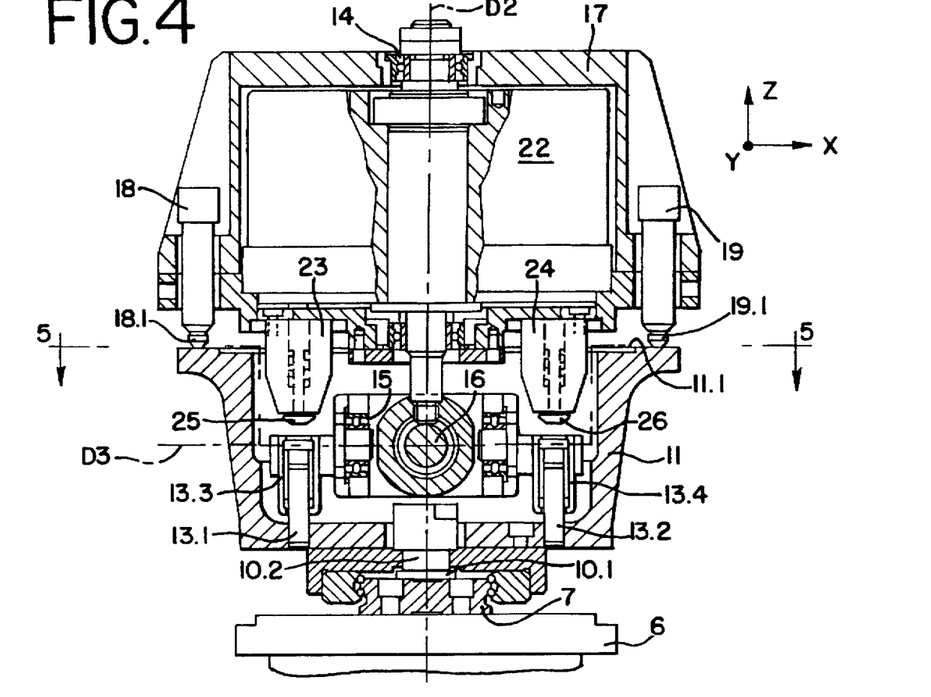
FIG. 4 illustrates an enlarged cross sectional view of the measuring element shown in FIG. 1.
Figure 5:
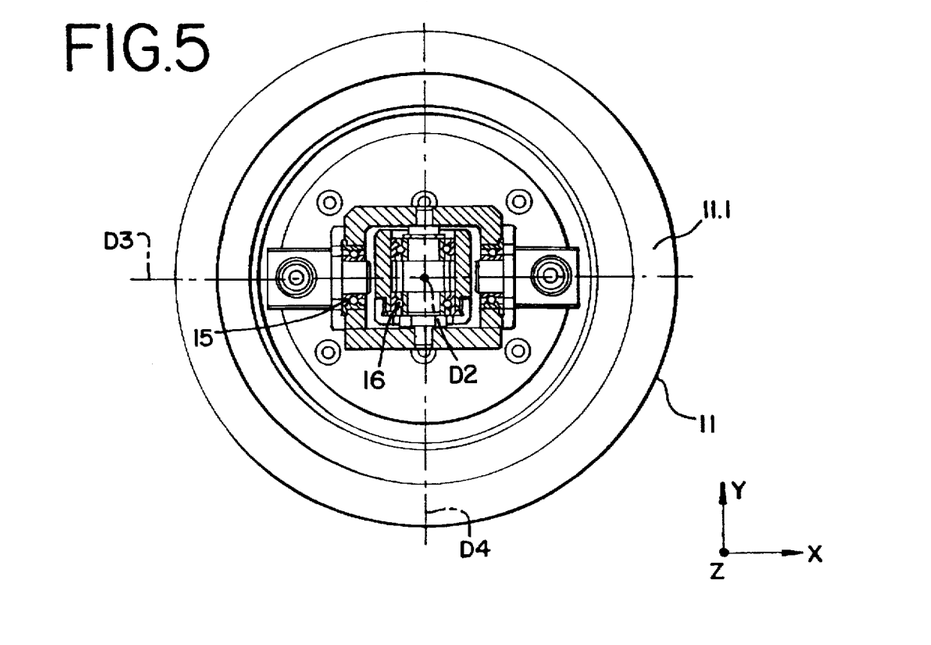
FIG. 5 is a cross sectional view of the measuring element shown in FIG. 4 taken along the line V—V.

In order to be able to exactly measure axial displacement in the Z direction along the axis of rotation D1 as well as pivot movements between the spindle 9 and the measuring carriage 11, a bearing which is pivotable in all directions and rotatable has been integrated into the measuring element 8. As shown in FIGS. 4 and 5, this bearing consists of a total of one linear guide 13 and three pivot bearings 14, 15, 16 around three axes of rotation D2, D3, D4.

A support 17, which can be moved with relation to the measuring carriage 11 via the bearings 13 to 16 is provided for fastening the measuring element 8 on the spindle 9.

With reference to FIG. 4, the linear guide 13 is formed of two bolts 13.1 and 13.2 fastened on the measuring carriage 11, with whom two corresponding bushings 13.3 and 13.4 cooperate, which in this way allow a linear movement between the measuring carriage 11 and the support 17 along the axis of rotation D2 in the Z direction. This linear movement in the Z direction is measured by at least one further linear measuring device 18 to 21 (FIG. 1) In the illustrated example this linear measurement is performed by means of several tracers 18 to 21 fastened in the support 17 whose tracing pins 18.1 to 21.1 rest on a surface 11.1 provided on the measuring carriage 11 at right angles with the axis of rotation D1.

A rotating movement of the spindle 9 with relation to the measuring carriage 11 around the axis of rotation D2 which, in the normal case extends parallel with the axis of rotation D1, is assured by the pivot bearing 14. The measurement of the angle of rotation around the axis of rotation D2 is performed by an angle measuring device 22, whose tracing unit is connected with the support 17 and therefore with the spindle 9, and whose graduated disk is connected with the measuring carriage 11.

A further rotating movement of the support 17 with relation to the measuring carriage 11 around the axis of rotation D3 is possible via the pivot bearing 15. A further pivot bearing 16 makes possible the rotating movement of the support 17 with relation to the measuring carriage 11 around the axis of rotation D4. The rotating movements around the axes of rotation D3 and D4 are measured by four spatially disposed tracers 18 to 21 by evaluating the linear difference between two tracers 18, 20 and 19, 21, which are placed symmetrically opposite each other. These rotating movements can also be directly measured by means of angle measuring devices disposed on the individual axes of rotation D3 and D4.

In order to assure rotating movements independent from each other around the three axes of rotation D2, D3 and D4 and yet achieve a stable , compact seating free of play, the mounting shown is particularly advantageous. By means of this mounting it is achieved that the three axes of rotation D2, D3 and D4, which extend perpendicularly with respect to each other, intersect at a common pivot point. Alternatively it would also be possible for the bearing to consist of a sphere which is rotatably seated in a ball socket.

Figure 3:
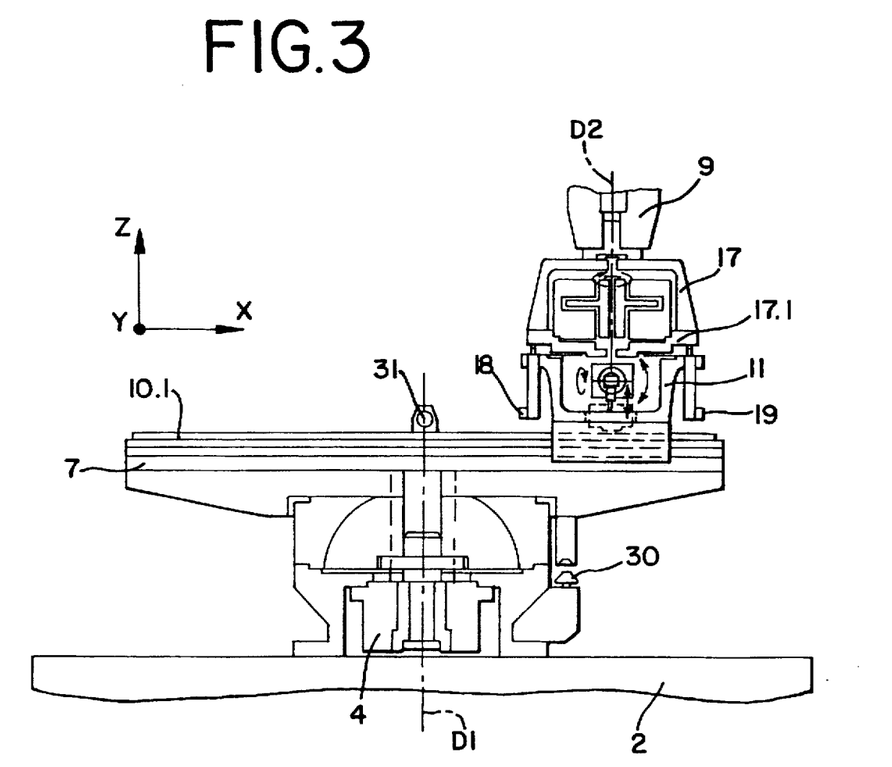
FIG. 3 is a schematic of a portion of a measuring arrangement in accordance with another preferred embodiment of the present invention.

FIG. 3 is a schematic of a portion of a measuring arrangement in accordance with another preferred embodiment of the present invention. According to this preferred embodiment, a level surface 17.1 is located on the support 17 instead of the measuring carriage 11 as illustrated in FIG. 4 and the tracers 18 to 21 are located on the measuring carriage 11 instead of the support 17. In addition it is possible to employ only one linear measuring device in place of the tracers 18 to 21, if the rotating movements around the axes of rotation D2 to D4 are measured by means of angle measuring devices. In this case the tracing head of this linear measuring device would be fastened on the measuring carriage 11 and the scale would be mounted on the support 17. It is of course also possible to fasten the tracing head on the support 17, but this would have the disadvantage that electrical lines would have to be run from the measuring carriage 11 and from the support 17 to an evaluation unit.

Figure 6:
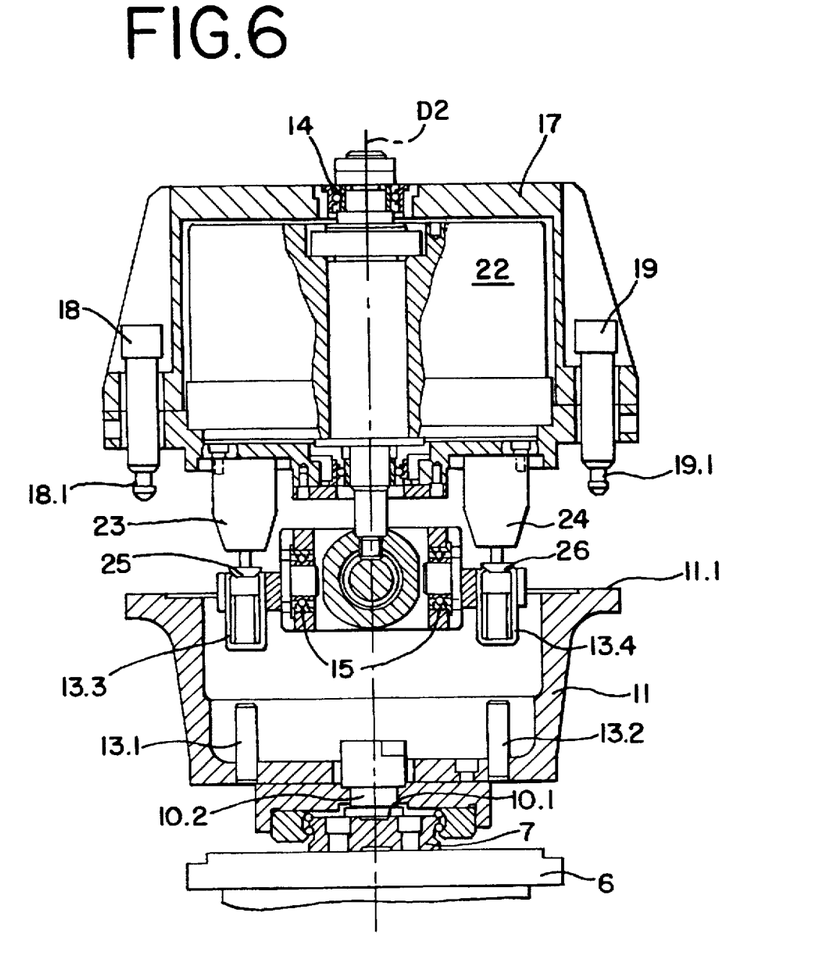
FIG. 6 illustrates an enlarged cross sectional view of the measuring element shown in FIG. 1 in a disengaged state.

The bolts 13.1 and 13.2 of the measuring carriage 11, together with the bushings 13.3 and 13.4 fastened on the support 17, form a releasable coupling between the measuring carriage 11 and the support 17. This releasable coupling makes possible an automated connection, which is shown in FIG. 6. If a check of a machine tool is to be performed, the support 17, for example, is removed automatically from a tool store and fastened on the spindle 9. So that a predetermined positional relationship between the joint 14, 15, 16 and the support 17 is maintained during this movement until the bushings 13.3 and 13.4 are positioned on the associated bolts 13.1 to 13.2, the bushings 13.3 and 13.4 are fixed in place by means of two controllable electromagnets 23 , 24. The fixing in place is performed in that two fixing elements 25, 26 are extended by means of the electromagnets 23, 24 in the direction of the bushings 13.3, 13.4 and cooperate with them until the operational position shown in FIG. 4 has been achieved In the operational position the electromagnets 23, 24 are switched off, so that the fixing elements 25, 26 are retracted by a spring force and in this way the operational connection with the bushings 13.3, 13.4 is released and the free movement between the support 17 and the measuring carriage 11 is made possible.

To perform a completely automated measuring operation it is particularly advantageous if the base body 3 with the linear guide 7 and the linear measuring device 10 is positioned by a pallet switcher in a numerically controlled manner on the carriage 2 of the machine tool. In order to avoid any interfering relative movement between the base body 3 and the rotatable component 6 during this process, as well as during the connecting process, these two elements are clamped by means of a fixing element 30. (FIG. 1) A further fixing element 31 is provided for clamping between the component 6 and the measuring carriage 11. Both fixing elements are controlled, for example via an electromagnet, in the same way as the fixing elements 25, 26 in FIG. 4.

In a further advantageous embodiment, sensors, for example, contactless operating sensors, are disposed in the measuring carriage 11 and/or the support 17 for reporting the achieved end positions after the successful connecting process to an evaluating device 27 and to permit the measuring program to run automatically only after successful connection.

Figure 7:
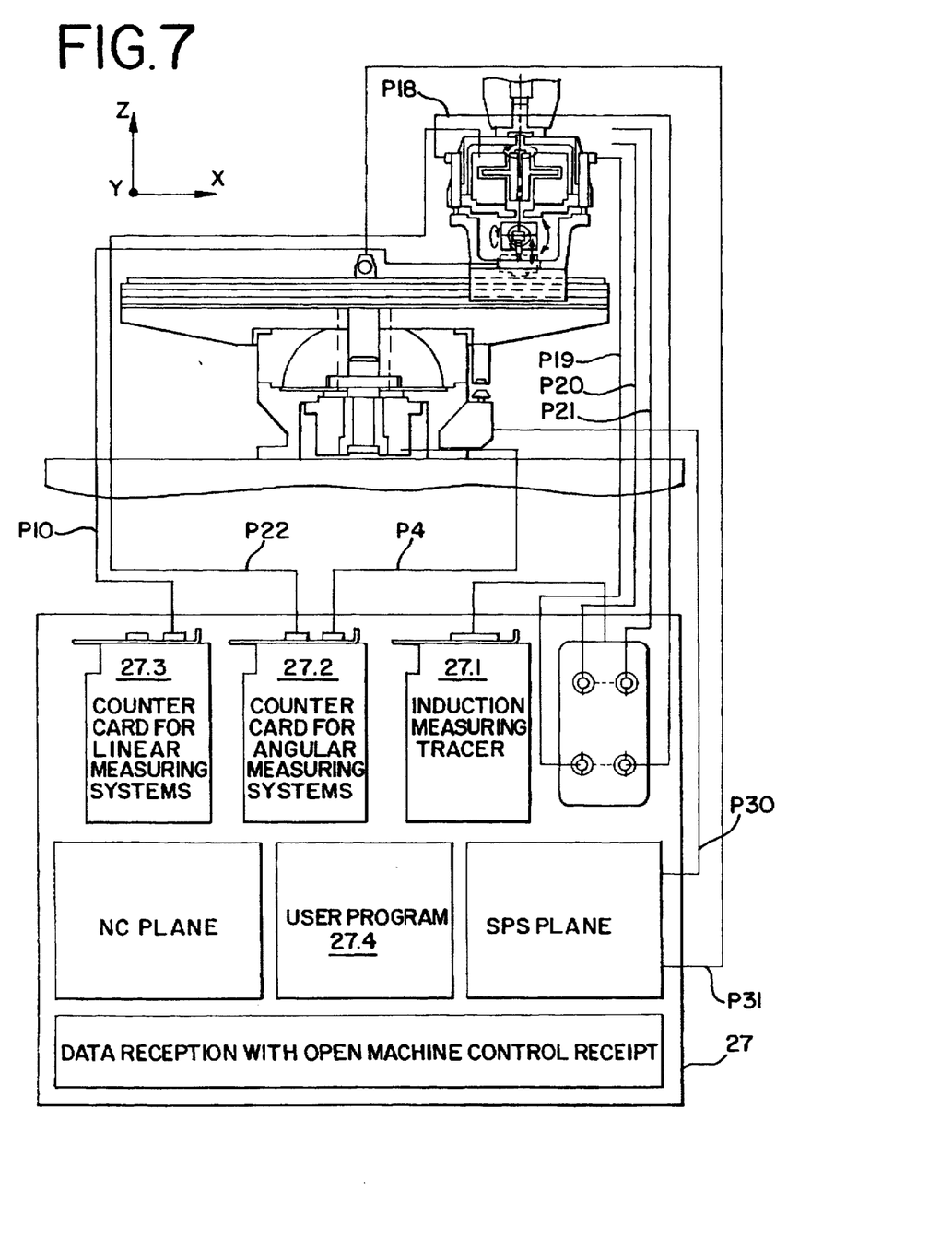
FIG. 7 is a schematic of a measuring arrangement according to a preferred embodiment of the present invention with an evaluating device.

An evaluating device 27 is shown in FIG. 7 coupled to the measuring arrangement shown in FIG. 1. The measured position values P18 to P21 of the four tracers 18 to 21 are provided to a counting unit 27 .1 of the evaluation device 27 and the tilt angles around the two axes of rotation are determined from this. A further counting unit 27.2 is provided with the measured position values P4, P22 of the two angle measuring devices 4 and 22 and the rotary movements around the two axes of rotation D1 and D2 are determined from this. A further counting unit 27.3 is provided for evaluating the measured position values P10 of the linear measuring device 10. The static and dynamic positional deviations are determined from all measured result by means of evaluation software 27.4. The fixing elements 30, 31 are also controlled by the evaluating unit 27 via separate lines P30, P31.

A check of the geometric accuracy of a CNC machine can be performed with the measuring arrangement 1 designed in accordance with the present invention not only at the first start-up, but also by the user himself repeatedly at defined intervals in order to realize controlled production processes within tolerance limits which are continuously tightened. The simultaneous measurement of lengths and angles permits the definite set-up of an error matrix for the software compensation of static and dynamic characteristic deviation values. The measurements can be performed with a small expenditure of time and personnel Repeated measurements are performed with little set-up efforts by means of fixedly predetermined measuring programs.

The measuring arrangement 1 basically has six degrees of freedom, wherein four rotational (around the axes of rotation D1, D2, D3, D4 ) and two translational (X and Z direction) joints permit the recording of individual deviations independently of each other. A 2D-evaluation in polar coordinates can take place with the angle information P4 of the turntable 3, 6 and the radial position P10 of the measuring carriage 11.

The yaw angle in the course of a linear movement along the guide 7 can be determined by using the angle measuring device 22, by means of which torsion between the spindle 9 and the measuring carriage 11 around the axis of rotation D2 is measured. The yaw angle is determined from the difference value of the measured position values P4 and P22 of the angle measuring devices 4 and 22. It is furthermore possible to detect the behavior of additional axes by means of the angle measuring device 22, which is particularly advantageous with robots or also with controllably rotatable spindles of machine tools.

Any limitation because of small tracer strokes is prevented by means of the linear measuring device 10 of the invention so that a rapid variation of the diameter of the circle can be tested during the circular form test, as well as other path curves such as rectangles and polygons. A real angle measurement is possible by the use of the angle measuring devices 4, 22, instead of a calculation of the angular position from the feed rate and time.

The linear measuring devices 10, 18 to 21, as well as the angle measuring devices 4, 22 are preferably photoelectric incremental systems, however, they can also operate in accordance with other physical principles, such as capacitively or magnetically. Inferometers also offer themselves as linear measuring devices 10, 18 to 21.

The evaluation software 27.4 and the counting units 27.1, 27.2, 27.3 can be installed on a measuring PC or a CNC control. The evaluation software 27.4 can also contain the possible measuring cycles for checking a CNC control. A test program for an automated rapid pickup of the XY plane of a CNC-controlled machine tool can contain the following measurement cycles.

During the measuring cycles, tilt angles (yawing, rolling, pitching) and linear deviations are detected in addition to the positions in the static as well as the dynamic measurements.

Movement in the X Direction

Position measurement with statistical evaluation in accordance with ISO 230-2 (for example 5 cycles)

Dynamic measurement with direct comparison with the machine measuring system     Step response test with shortening of the step length Movement in the Y Direction     Position measurement with statistical evaluation in accordance with ISO 230-2 (for example 5 cycles)

Figure 8:
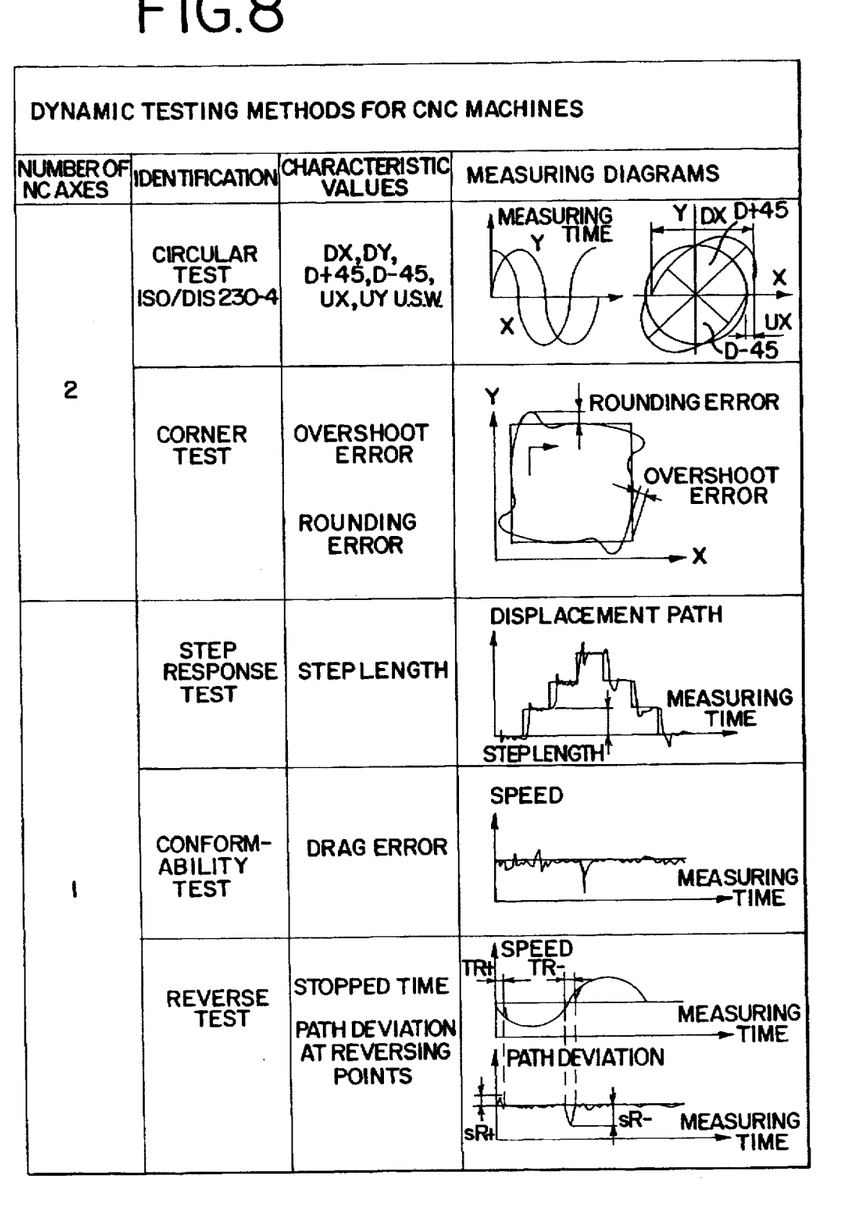
FIG. 8 is a list of some possible testing methods.

Dynamic measurement with direct comparison with the machine measuring system     Step response test with shortening of the step length Circular Test     Circular form test at slow feed rates in a clockwise direction     Circular form test at slow feed rates in a counter-clockwise direction     Circular form test at high feed rates in a clockwise direction     Circular form test at high feed rates in a counter-clockwise direction Corner Test     Corner test at slow feed rates in a clockwise direction     Corner test at slow feed rates in a counter-clockwise direction     Corner test at high feed rates in a clockwise direction     Corner test at high feed rates in a counter-clockwise direction Some of the possible dynamic testing methods for CNC machines are listed in FIG. 8 and the measuring diagrams for these tests are also shown. For checking, the measuring diagrams can be displayed on the screen of the CNC control and, if desired, printed out by means of a printer.

Figure 9:
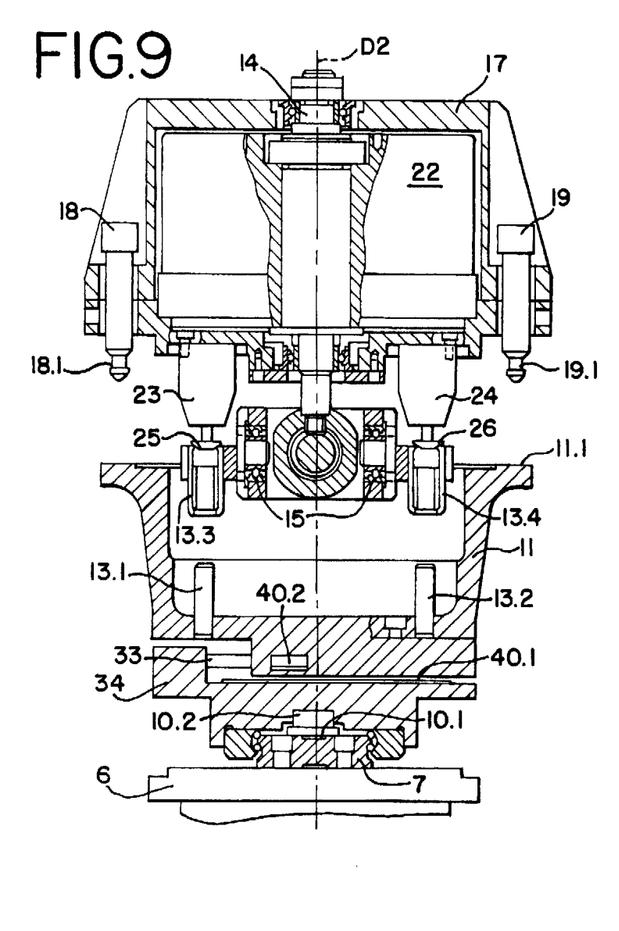
FIG. 9 is a schematic of a portion of a measuring arrangement in accordance with a preferred embodiment of the present invention.

In order to assure the measuring accuracy of the measuring arrangement 1 over the entire measuring length of the linear guide 7, and in order to be able to perform circular form tests with very small path dimensions, the measuring arrangement 1 is provided with a transverse guide 33 in accordance with a further example represented in FIG. 9. This transverse guide 33 forms a kind of compound table with the linear guide 7 by means of which the spindle 9 can be moved in the X, Y plane with relation to the carriage 2. This transverse guide 33 is disposed normally with respect to the linear guide 7 wherein movements of the measuring element 8 along the transverse guide 33 are measured by means of a further linear measuring device 40. A measurement representation 40.1 and a scanning unit 40.2 are provided for this. In the illustrated example the scanning unit 40.2 is fastened on an intermediate element 34 which is movable along the guide 7. This intermediate element 34 supports the transverse guide 33 with the measurement representation 40.1. The measuring carriage 11 supports the scanning unit 40.2 and is displaceable with relation to the transverse guide 33 normally (in the X direction) with respect to the linear guide 7. The transverse guide 33 is only schematically indicated as a guide pin. The bolts 13.1 and 13.2 as well as the surface 11.1 are disposed on the measuring carriage 11, as already extensively described.

Figure 10:
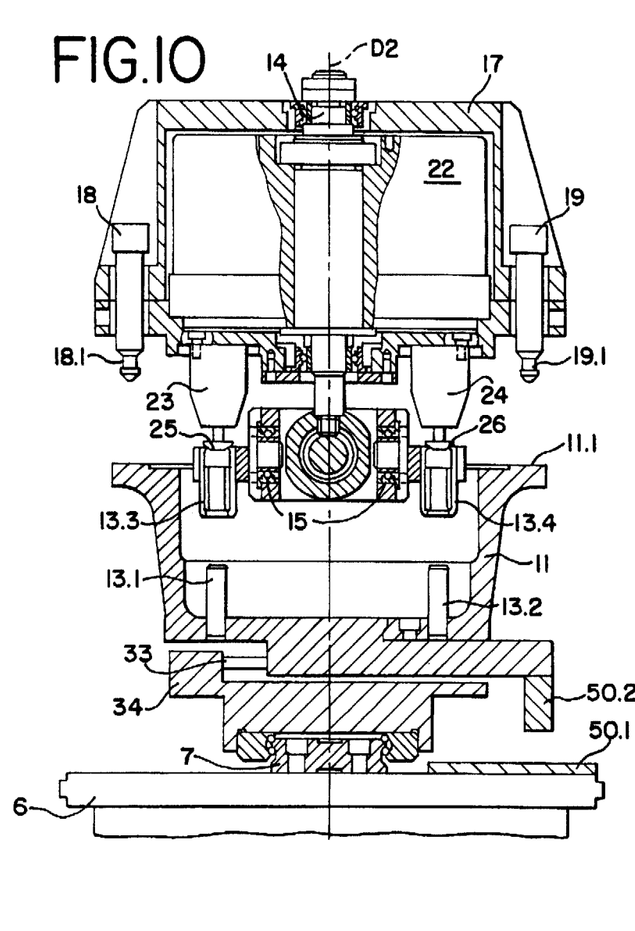
FIG. 10 is a schematic of a portion of a measuring arrangement in accordance with a preferred embodiment of the present invention.

As shown in FIG. 10, it is possible to provide a common two-dimensional measurement representation 50.1 in place of two separate measurement representations 40.1. This measurement representation 50.1 can be a two-dimensional cross grating fastened on the component 6. The cross grating 50.1 is disposed parallel with the displacements paths (degrees of freedom) of both guides 7 and 33. The scanning unit 50.2 is fastened on the measuring carriage 11 for scanning preferably photo-electrically, the cross grating 50.1.

A measuring arrangement 1 which can be employed in many uses is created by means of this additional transverse guide 33. In connection with the measurements it must be assured that the measuring element 8 can be moved either around the axis of rotation D1 or along the transverse guide 33 in order to prevent an ambiguity because of seven degrees of freedom. To accomplish this it is necessary to block, for example clamp, either the rotational movement of the component 3 around the axis of rotation D1 or the linear movement along the transverse guide 33. Clamping of the component 3 can take place particularly advantageously by means of the fixing element 30. To clamp the longitudinal movement (X direction) of the measuring element 8 with respect to the transverse guide 33 a further fixing element, not shown, should be provided. This fixing element can be an electromagnet comparable to the fixing element 30.

One advantage of the additional transverse guide 33 is the simple possibility for centering the base body 3 with the axis of rotation 3 with the programmed circular path axis when performing circular form tests. The axis-parallel portions of the eccentricity are directly indicated when moving past the center of the programmed circular path. In addition, jamming at the center position of the axis of rotation D1 is prevented by the transverse guide 33.

A great advantage also lies in that the measuring accuracy normally to the linear guide 7 is constant over the entire measured length (with any arbitrary position along the line guide 7) during position measuring with the linear measuring device 40. However, during position measuring with the angle measuring device 4 in polar coordinates the system accuracy decreases with the increase of the radial measuring position toward the outside.

A further advantage, in particular of the embodiments of FIGS. 9 and 10 consists in that circular form tests and free form tests with very small path dimensions for the exclusive checking of controls and drives by means of the movement along the linear and transverse guides 7, 33 can be performed with comparatively small inertia effects of the moved elements.

Figure 11:
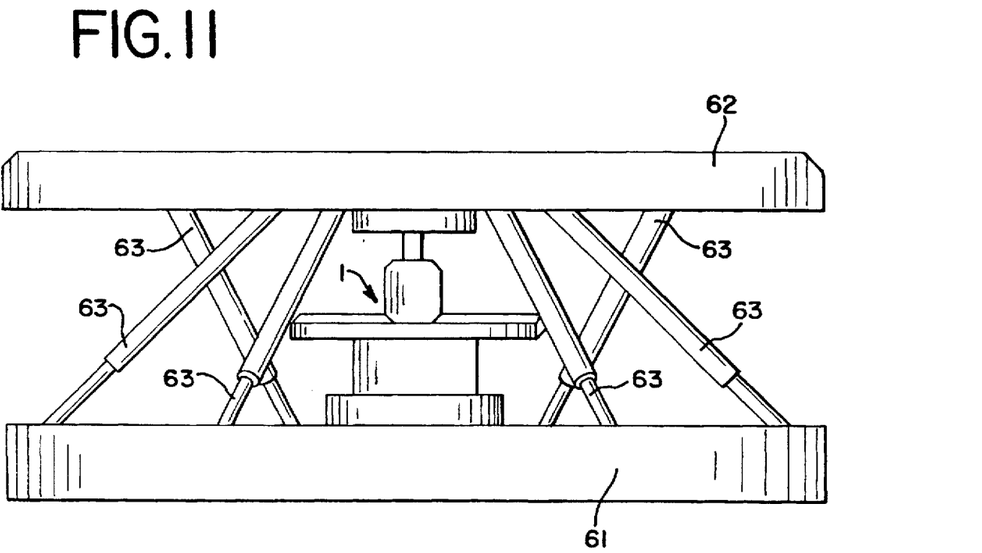
FIG. 11 shows the application of the measuring arrangement to a hexapod machine.

In the future so-called hexapod machines (FIG. 11) will most likely represent an alternative to the classic machine tool concepts. A hexapod machine is understood to be a machine tool in which the connection between the machine base body 61 and the tool support plate 62 is made by means of a line of telescopic legs 63. The controlled linear displacements of these telescopic elements 63 cause the desired movements of the tool plate 62 and thus of the tool. In comparison to conventional carriage systems, this machine structure causes greater tilting or rotations of the tool in relation to the workpiece, for which reason a simultaneous measurement of the positional and angular deviations is of even greater importance. Based on its universality, the measuring arrangement 1 in accordance with the instant invention is also suitable for measuring hexapods. Such a hexapod machine with the measuring arrangement 1 embodied in accordance with the present invention is shown FIG. 11. The detected deviation values relate to the Cartesian workpiece coordinate system and therefore make the evaluation of the effects of errors on the workpieces easier. The measuring arrangement 1 on or in the processing machine represents the workpiece, so to speak, and also permits the dynamic detection of the deviations in the course of a circular movement or a free-form movement.

Figure 12:
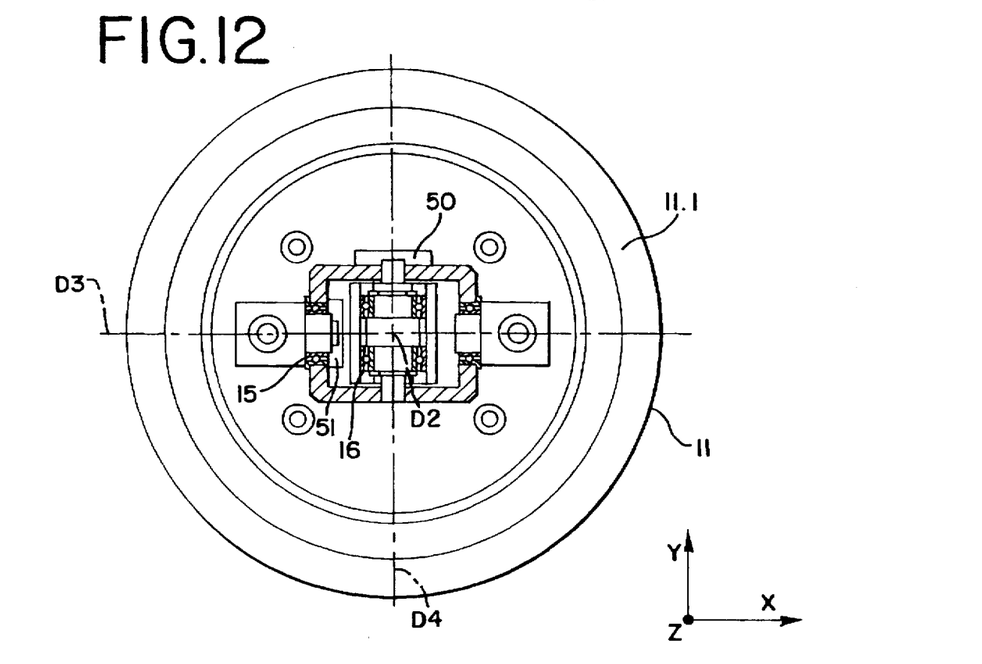
FIG. 12 is a cross-sectional view of a measuring element according to a preferred embodiment of the invention.

FIG. 12 is a cross-sectional view of a measuring element according to another preferred embodiment of the invention. FIG. 12 is similar to FIG. 5 and the same reference numerals have been used to designate like parts. FIG. 12 differs from FIG. 5 in its illustration of a plurality of angular measuring devices 50 and 51

It is to be understood that the forms of the invention described herewith are to be taken as preferred examples and that various changes in the shape, size and arrangement of parts may be resorted to, without departing from the spirit of the invention or scope of the claims.

What is claimed is:

1. A measuring arrangement for checking the geometric and dynamic accuracy of two machine elements moved in relation to each other, the measuring arrangement comprising;
   a base body fastened on a first machine element;
   a component, rotatably seated on the base body and having a guide for a measuring element that is releasably connected with a second machine element;
   an angle measuring device for measuring the rotation of the component with respect to the base body around a first axis of rotation;
   a linear measuring device provided radially with respect to the axis of rotation of the component, for detecting the movements of the measuring element along the guide wherein the linear measuring device has a measurement representation and a scanning unit which can be moved relatively thereto, and the measuring range of the linear measuring device corresponds approximately to the possible displacement path of the machine elements moved with relation to each other; and
   a measuring carriage on which the scanning unit is disposed, wherein the measuring carriage is simultaneously the support of at least one further linear measuring device for measuring the axial displacement between the measuring carriage and a support which can be releasably connected with the first machine element.

2. A measuring arrangement according to claim 1 further comprising a bearing with at least second and third axes of rotation placed perpendicularly thereupon provided between the support and the measuring carriage, around which the support can be pivoted in relation to the measuring carriage.

3. A measuring arrangement according to claim 2 wherein the second and third axes of rotation are located in a plane which is parallel with that plane in which the measuring carriage can be displaced in relation to the guide.

4. A measuring arrangement according claim 2 or claim 3 further comprising a bearing with a fourth axis of rotation which extends perpendicularly in respect to the said axes of rotation is provided between the support and the measuring carriage.

5. A measuring arrangement according to claim 4 wherein the bearing is a cardanic bearing with three cardan shafts extending perpendicularly with respect to each other and constituting the axes of rotation.

6. A measuring arrangement according to claim 5 wherein angle measuring devices are fastened on the three cardan shafts, wherein the rotating movements between the support and the measuring element around the three axes of rotation can be measured by means of said angle measuring devices.

7. A measuring arrangement according to claim 4 further comprising an angle measuring device for measuring the rotational movement between the measuring carriage and the support around the fourth axis of rotation.

8. A measuring arrangement according to claim 2 wherein a tracing surface is provided on the measuring carriage and that at least three spatially distributed linear measuring devices are fastened on the support which cooperate with the tracing surface and in the course of relative movements between the support and the measuring carriage around the axes of rotation distance changes occur between the tracing surface and the longitudinal measuring devices, which can be measured with the longitudinal measuring devices.

9. A measuring arrangement according to claim 1 wherein one of the guide has a length which at least corresponds to the possible displacement path of the machine elements moved with respect to each other.

10. A measuring arrangement according to with claim 9 wherein the measurement representation is provided on the guide.

11. A measuring arrangement according to claim 1 wherein the measuring carriage and the support of the measuring element are releasably connected with each other by means of a connector.

12. A measuring arrangement according to claim 11 wherein the connector is a linear guide consisting of a plurality of bolts and corresponding bushings.

13. A measuring arrangement according to claim 12 wherein the bushings are disposed on a cardan shaft of a pivot bearing and the bolts are disposed on the measuring carriage and extend perpendicularly with the first linear guide and parallel with the first axis of rotation.

14. A measuring arrangement according to claim 12 wherein fixing elements are provided on the support, which can be brought into engagement with the bushings during the connection of the support and the measuring carriage and after the connection has been made, can be disengaged.

15. A measuring arrangement according to claim 1 further comprising a guide with a linear measuring device for detecting the movement of the measuring element along this guide, wherein the guide is a linear guide which permits a relative movement of the measuring element transversely to the guide and is oriented orthogonally with respect to the first axis of rotation at least as much as possible.

* * * * *

UNITED STATES PATENT AND TRADEMARK OFFICE
CERTIFICATE OF CORRECTION

PATENT NO.   : 5,767,380
DATED        : June 16, 1998
INVENTOR(S)  : Franz Haas

It is certified that error appears in the above-indentified patent and that said Letters Patent is hereby corrected as shown below:

In claim 4, line 1, after "according" insert --to--.

In claim 10, line 1, delete "with".

Signed and Sealed this

Twelfth Day of September, 2000

Attest:

Q. TODD DICKINSON

*Attesting Officer*    *Director of Patents and Trademarks*